United States Patent [19]

Stroud

[11] Patent Number: 5,424,599
[45] Date of Patent: Jun. 13, 1995

[54] DUAL DELTA ALTERNATOR

[76] Inventor: Leburn W. Stroud, 6546 Baker Blvd., Fort Worth, Tex. 76118

[21] Appl. No.: 23,886

[22] Filed: Feb. 26, 1993

Related U.S. Application Data

[63] Continuation-in-part of Ser. No. 4,992, Jan. 15, 1993, abandoned.

[51] Int. Cl.⁶ .................................................. H02K 3/00
[52] U.S. Cl. ................................ 310/198; 310/184; 310/263
[58] Field of Search ................... 310/216, 68 R, 68 D, 310/111, 198, 184, 199, 200, 208; 322/28

[56] References Cited

U.S. PATENT DOCUMENTS

| | | | |
|---|---|---|---|
| 3,793,544 | 2/1974 | Baumgartner et al. | 320/17 |
| 4,117,390 | 9/1978 | Iwata et al. | 322/90 |
| 4,161,683 | 7/1979 | Stroud et al. | 322/87 |
| 4,163,187 | 7/1979 | Thomas | 322/29 |
| 4,330,715 | 5/1982 | Stroud et al. | 307/10 R |
| 4,336,485 | 6/1982 | Stroud | 320/15 |
| 4,347,473 | 8/1982 | Stroud | 320/15 |
| 4,354,127 | 10/1982 | Stroud | 310/198 |
| 4,356,418 | 10/1982 | Stroud | 310/184 |
| 4,454,464 | 6/1984 | Stroud | 322/28 |
| 4,509,005 | 4/1985 | Stroud | 320/68 |
| 4,549,106 | 10/1985 | Stroud | 310/184 |
| 4,720,645 | 1/1988 | Stroud | 310/68 D |

*Primary Examiner*—Thomas M. Dougherty
*Assistant Examiner*—D. R. Haszko
*Attorney, Agent, or Firm*—Arthur F. Zobal

[57] ABSTRACT

The alternator has an annular stationary stator and a rotor concentrically located therein with two, three phase delta windings wound on the stator core. In one embodiment, the two three phase windings are connected together in series for use with two batteries for supplying 12 and/or 24 volts D.C. In this embodiment the two three phase windings are the same and are wound on the segments of the core such that coils of the same number of turns are wound around the same groups of segments. In another embodiment, the two three phase windings are connected together in parallel for use with one battery for supplying 12 volts D.C. In this embodiment, the two three phase windings are different and are wound on the segments of the core such that coils of different turns are wound around the same groups of segments.

39 Claims, 10 Drawing Sheets

DUAL DELTA ALTERNATOR

This application is a continuation-in-part of U.S. patent application Ser. No. 08/004,992 entitled "Alternator With Regenerative Feedback", filed Jan. 15, 1993, now abandoned.

BACKGROUND OF THE INVENTION

1. Field of the Invention

The invention relates to an alternator for use on a motor vehicle.

2. Description of the Prior Art

My U.S. Pat. Nos. 4,161,683; 4,336,485; 4,347,473; 4,354,127; 4,356,418; 4,330,715; 4,454,464; 4,549,106; 4,509,005; and 4,720,645; disclose different types of alternators and systems for supplying electrical power.

SUMMARY OF THE INVENTION

It is an object of the invention to provide an alternator of the type having an annular stationary stator and a rotor concentrically located therein with two, three phase delta windings wound on the stator core.

In one embodiment, the two three phase windings are connected together in series for use with two batteries for supplying 12 and/or 24 volts D.C. In this embodiment, the two three phase windings are the same and are wound on the segments of the core such that coils of the same number of turns are wound around the same group of segments.

In another embodiment, the two three phase windings are connected together in parallel for use with one battery for supplying 12 volts D.C. In this embodiment, the two three phase windings are different and are wound on the segments of the core such that coils of different turns are wound around the same groups of segments.

DESCRIPTION OF THE PREFERRED EMBODIMENTS

Figure 1:
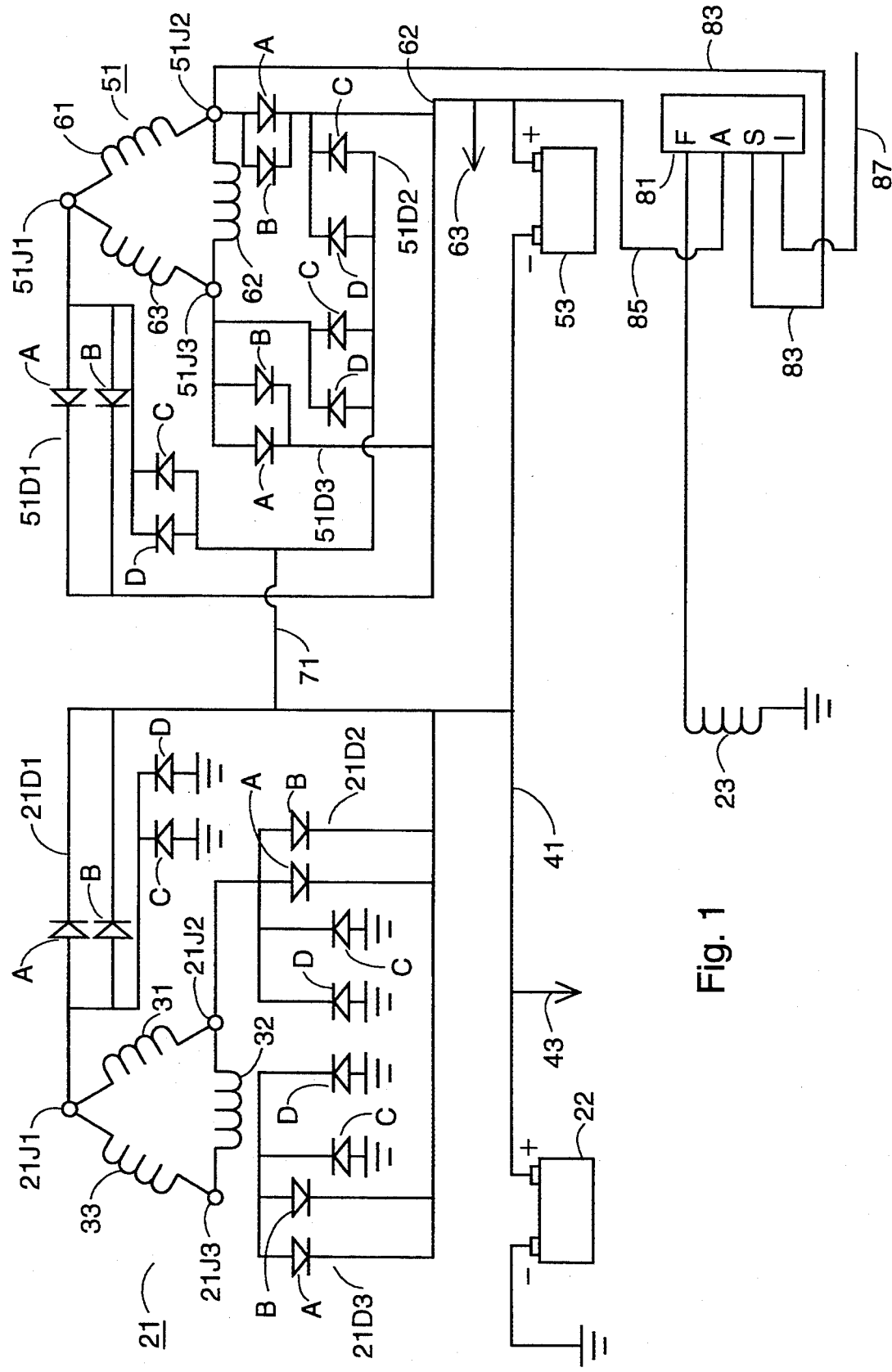
FIG. 1 is an electrical schematic of the embodiment of the invention wherein the two three phase windings are connected together in series.

Referring now to FIG. 1 of the drawings, the alternator comprises two three phase delta stator windings 21 and 51 connected together in series; and to two 12 volt batteries 22 and 53. The alternator has a single rotor coil 23.

The three phase winding 21 is formed of three windings 31, 32, 33 with the ends of adjacent windings connected together at junctions 21J1, 21J2, and 21J3 respectively. Three diode bridges 21D1, 21D2, and 21D3 are connected to junctions 21J1, 21J2, and 21J3 respectively and to a lead 41 which is connected to the plus terminal of the battery 22, the minus terminal of which is connected to ground. Each of the diode bridges comprises 4 diodes A, B, C, and D connected as shown. An output lead 43 is connected to lead 41.

The three phase winding 51 is formed of three windings 61, 62, and 63 with the ends of adjacent windings connected together at junctions 51J1, 51J2, and 51J3 respectively. Three diode bridges 51D1, 51D2, and 51D3 are connected to junctions 51J1, 51J2, and 51J3 respectively and to a lead 62 which is connected to the plus terminal of the battery 53, the minus terminal of which is connected to lead 41. Each of the diode bridges comprises 4 diodes A, B, C, and. D connected as shown an output lead 63 is connected to lead 62.

In FIG. 1, all of the diodes A and B are the same and all of the diodes C and D are the same. In addition all of the windings 31, 32, 33, 61, 62, and 63 are the same. Lead 71 connects windings 21 and 51 together such that windings 21 and 51 are connected in electrical series. A 12 volt output is taken from lead 43 and a 24 volt output is taken from lead 63. This system is useful on some vehicles, such as army vehicles that use 12 and 24 volt systems.

A 24 volt regulator 81 is provided having terminals F, S, A, and I. The F terminal is connected to one end of the rotor coil 23 which has its other end connected to ground. The S terminal is connected by lead 83 to winding 51; the A terminal is connected by lead 85 to lead 62 and the I terminal is connected by lead 87 to the ignition switch of the vehicle on which the alternator of FIG. 1 is located.

In operation of the system, the ignition switch is closed and current is applied to the I terminal of the regulator 81 which current then goes to the F terminal. When the rotor 23 begins to rotate, voltage will appear on the S terminal which voltage will switch the A terminal to the F terminal by way of a transistor circuit in the regulator and the I terminal is released. Conventionally current flow form the A terminal regulates the output at 63 to 24 volts. If the voltage of the battery 53 is increased or decreased, the voltage on the rotor 23 is reduced or increased by the regulator to maintain 24 volts across the battery 53. If the voltage of the battery goes to a certain level above 24 volts, i.e. 28 volts, the regulator decreases to current to the rotor coil 23 to decrease the voltage on the output lead 63 across the battery. If the voltage of the battery 53 goes below 24 volts, the regulator supplies more current to the rotor coil 23 to increase the voltage on the output lead 63 across the battery.

Thus if current is drawn from lead 63, the regulator will be actuated to maintain the voltage across lead 63 at 24 volts. If current is drawn from lead 43, the voltage at lead 63 will drop because it is in series with lead 43 and the regulator will be actuated to maintain the voltage across lead 63 at 24 volts.

Figure 2:
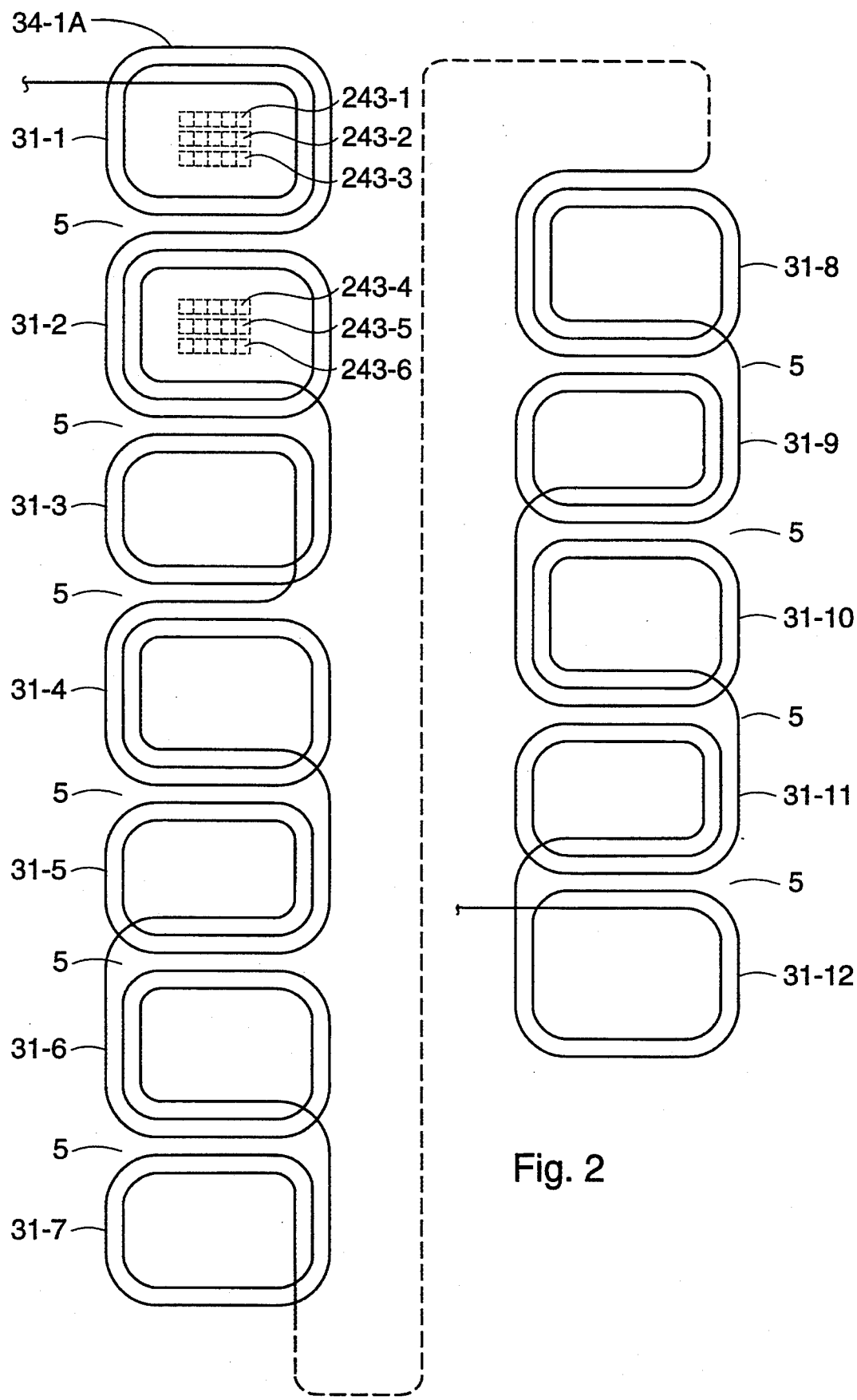
FIG. 2 illustrates one winding of the two three phase windings of FIG. 1.
Figure 3:
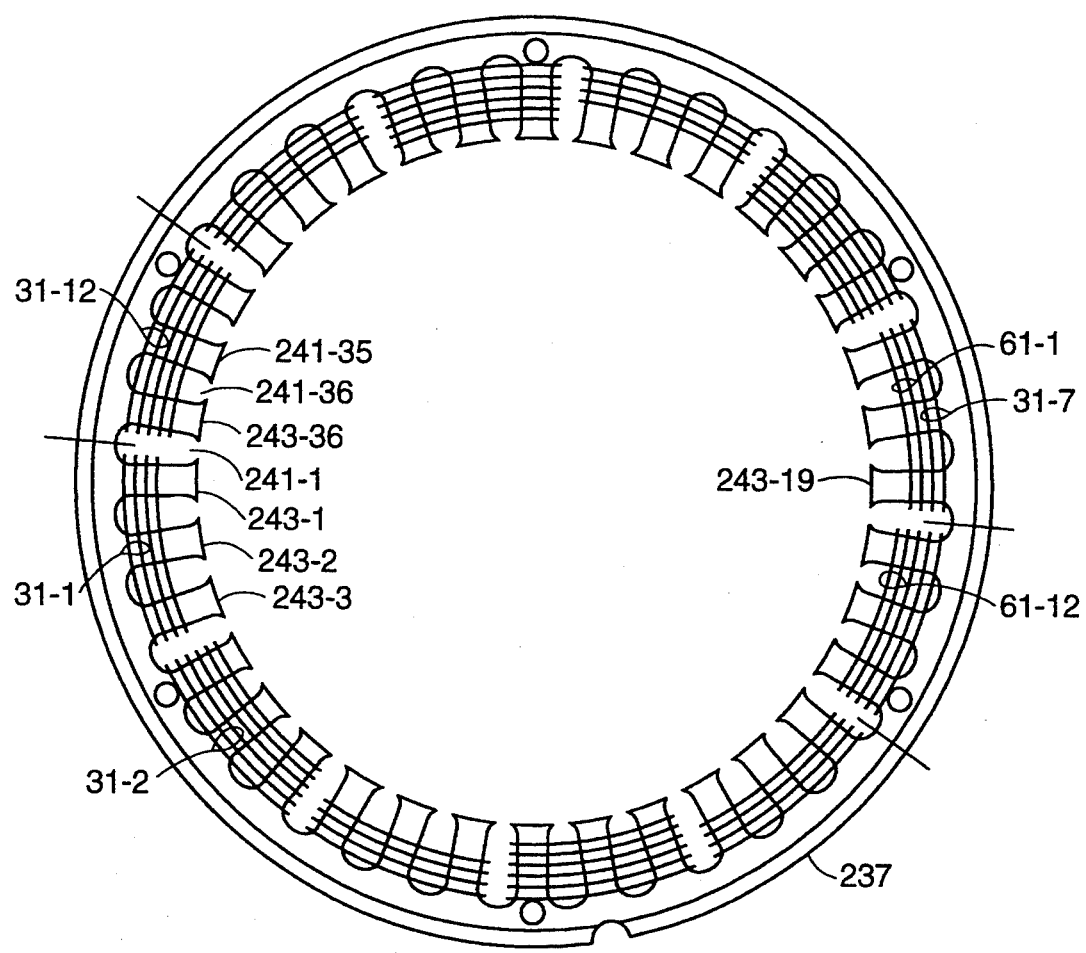
FIG. 3 is a plan view of the stator core of the alternator of FIG. 1 showing two windings of the two three phase windings wound on the stator core.
Figure 4:
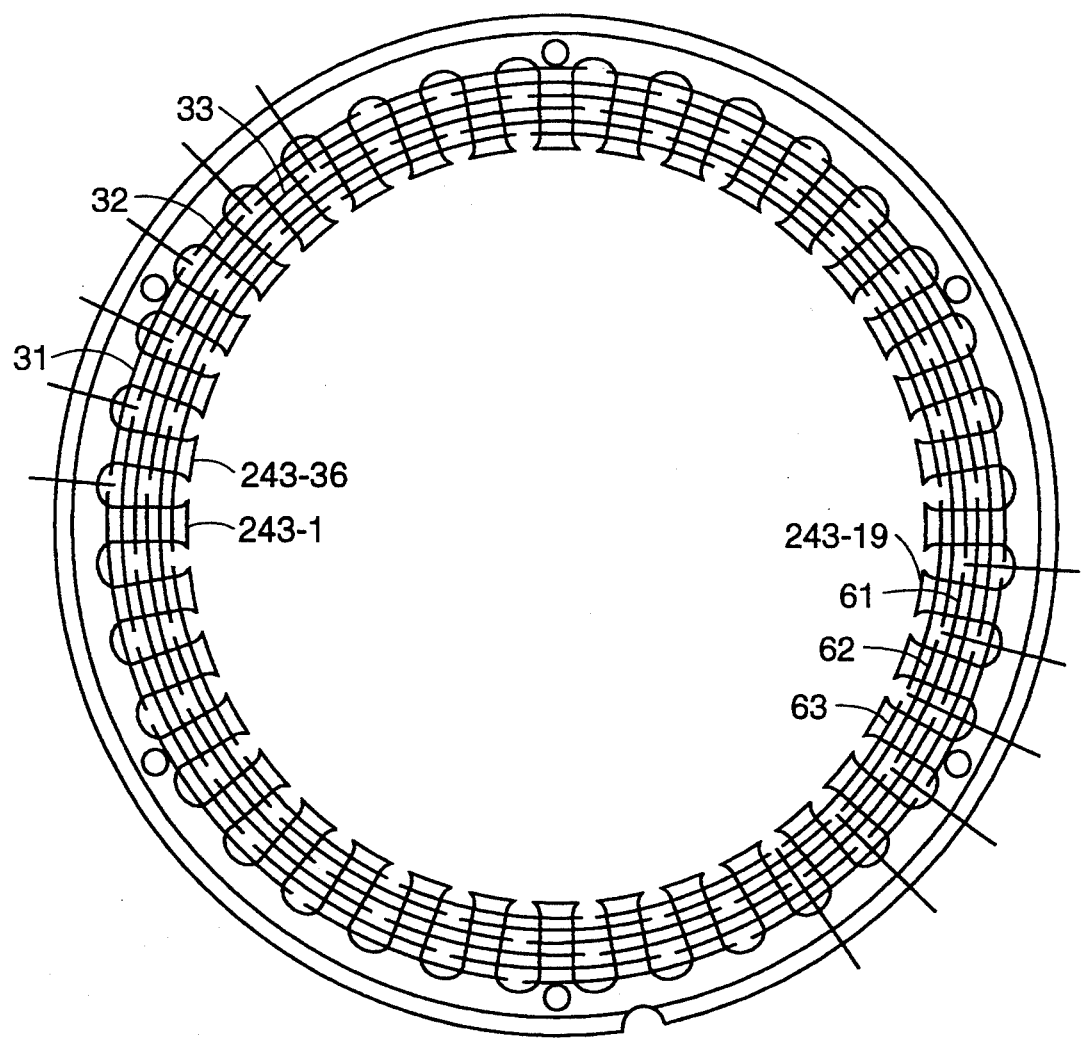
FIG. 4 is a plan view of the stator core of the alternator of FIG. 1 showing both three phase windings wound on the stator core.

As indicated above, windings 31, 32, 33, 61, 62, and 63 are identical and both three phase windings 21 and 51 are wound on the same stator coil. Winding 31 is shown in FIG. 2 and a plan view of the stator core is shown at 237 in FIG. 3. The core 237 has 36 slots and 36 segments. The winding 31 has 12 coils 31-1 through 31-12. The turns of the left hand edges of coils 31-1 to 31-12 are as follows: 2, 3, 2, 3, 2, 3, 2, 3, 2, 3, 2, and 2 respectively with 5 turns between adjacent coils. The core 237 has 36 slots 341-1 through 341-36 and 36 segments 243-1 through 243-36 respectively. The 12 coils of winding 31 are wound around 12 groups of three segments of the core. For example coil 31-1 is wound around a group of segments.243-1, 243-2, and 243-3; coil 31-2 is wound around a group of segments 243-4, 243-5, 243-6, etc. continuing counter clockwise as disclosed in Table I such that the slot between adjacent groups of segments will have 5 turns of winding 31 located therein. Effectively the coil 31-12 is the same as the 3 turn coils.31-2, 31-4, 31-6, 31-8 and 31-10 since it provides sufficient turns on each of its two sides which when combined with the side turns of the adjacent coils 31-11 and 31-1, there are provided 5 turns between coil 31-12 and coil 31-11 and 5 turns between coil 31-12 and coil 31-1 in the slots of the core 237. The 12 coils of the winding 32 will be wound around 12 groups of 3 segments starting with segments 243-36, 243-1, 243-2 and continuing counter clockwise as disclosed in Table I. The 12 coils of the winding 33 will be wound around 12 groups of 3 segments starting with segments 243-35, 24336, and 243-1 and continuing counter clockwise as disclosed in Table I. Windings 32 and 33 are not shown in FIG. 3. In FIG. 4 the coils of windings 31, 32, and 33 are shown as single turn coils, although it is to be understood that each of the windings 31, 32, and 33 in FIG. 4 will be the same as winding 31 as shown in FIGS. 2 and 3.

The 12 coils of windings 61, 62, and 63 will be wound around 12 groups of 3 segments starting 180 degrees from the starting points of coils 31, 32, and 33 respectively. For example, referring to FIG. 3, coil 61-1 of winding 51 is wound around a group of segments 243-19, 243-20, 243-21; coil 61-2 is wound ground a group of segments 234-22, 234-23, 234-24, continuing counter clockwise as disclosed in Table II such that the slots between adjacent groups of segments will have 5 turns of winding 61 located therein. The 12 coils of winding 62 will be wound around 12 groups of 3 segments starting with segments 243-18, 143-19, 143-20 and continuing counter clockwise as disclosed in Table II. The 12 coils of winding 63 will be wound around 12 groups of 3 segments starting with segments 243-17, 143-18, 143-19 and continuing counter clockwise as disclosed in Table II. In FIG. 4, the coils of windings 61, 62, and 63 are shown as single turn coils, although it is to be understood that each of the windings 61, 62,and 63 will be the same as winding 31 as shown in FIG. 2 and as shown in FIG. 3.

Thus for windings 31 and 61, the coils with 2 turns respectively will be wound around the same groups of 3 segments and the coils with 3 turns respectively will be wound the same groups of 3 segments respectively. Similarly, for windings 32 and 62, the coils with 2 turns respectively will be wound around the same groups of 3 segments and the coils with 3 turns respectively will be wound around the same groups of 3 segments respectively. In addition, for coils 33 and 63, the coils with 2 turns respectively will be wound the same groups of 3 segments and the coils with 3 turns respectively will be wound the same groups of 3 segments respectively.

This insures that the windings of delta winding 21 are in phase with the windings of delta winding 51 to prevent an unbalance in the system which may result in a cancellation of the outputs. By having the windings of the two delta windings 21 and 51 identical, one delta winding will not become predominant over the other in operation.

Figure 5:
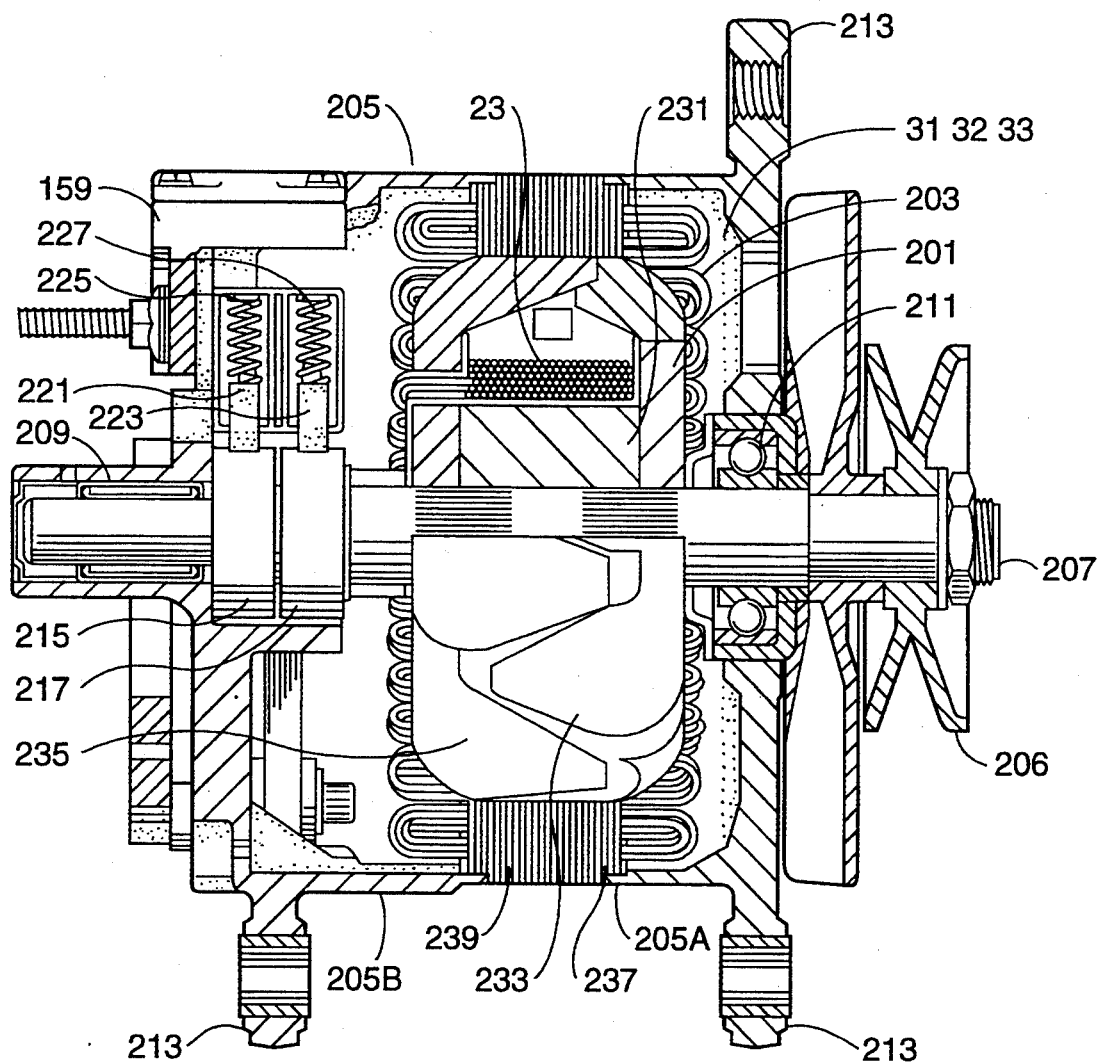
FIG. 5 is a cross-sectional view of an alternator showing its rotor supported for rotation within the stator.

Referring now to FIG. 5 there will be described more details of the internal components of the alternator. It comprises a rotor 201 and a stator 203, the latter of which is fixedly carried by the housing or case 205 comprising front and rear portions 205A and 205B secured together by bolts (not shown). Rotor 201 is rotatably carried by a shaft 207 which is journaled by roller bearing 209 and ball bearings 211 to the case 205. Brackets 213 formed to the case 205 are adapted to receive bolts for coupling the alternator to mounting means adjacent the engine of the vehicle. A pulley 206 is mounted to the shaft 207 for receiving the belt from the engine for rotating the rotor 201.

Shaft 207 has two slip rings 215 and 217 mounted rigidly to it and insulated from each other and from the shaft. Slip rings 215, 217 are connected by conductors (not shown) to the coil 23 of rotor 201. Carbon brushes 211 and 223 are biased by springs 225 and 227 into sliding contact with the slip rings 215 and 217. Slip rings 215 and 217 apply a D.C. exiting voltage to the rotor 201 as obtained from the regulator.

Rotor 201 comprises a ferro-magnetic core 231 which is wound with conductive wire defining the rotor coil 23. The opposite sides of the core 231 have end portions which form north and south poles 233 and 235. The poles extend inward and mesh, but do not touch, with corresponding pole of the opposite polarity.

Stator 203 comprises the annular core 237 formed of a plurality of stacked ferro-magnetic plates 239. A plan view of the core 237 is shown in FIGS. 3 and 4. As seen in this figure, there are thirty-six slots 241 formed in the stator core 237. Slots 241 extend parallel to the axis of the core 237 the full width of the core. The thirty-six portions of the core between the slots 241 are defined as the segments 243. Electrically insulating inserts (not shown) are located in the slots between their wall structure and the wires of the coils of the windings to prevent electrical contract between the wires and the core. Rotor 201 is supported within the stator core 237, with the poles 233 and 235 being spaced from segments 243.

Figure 6:
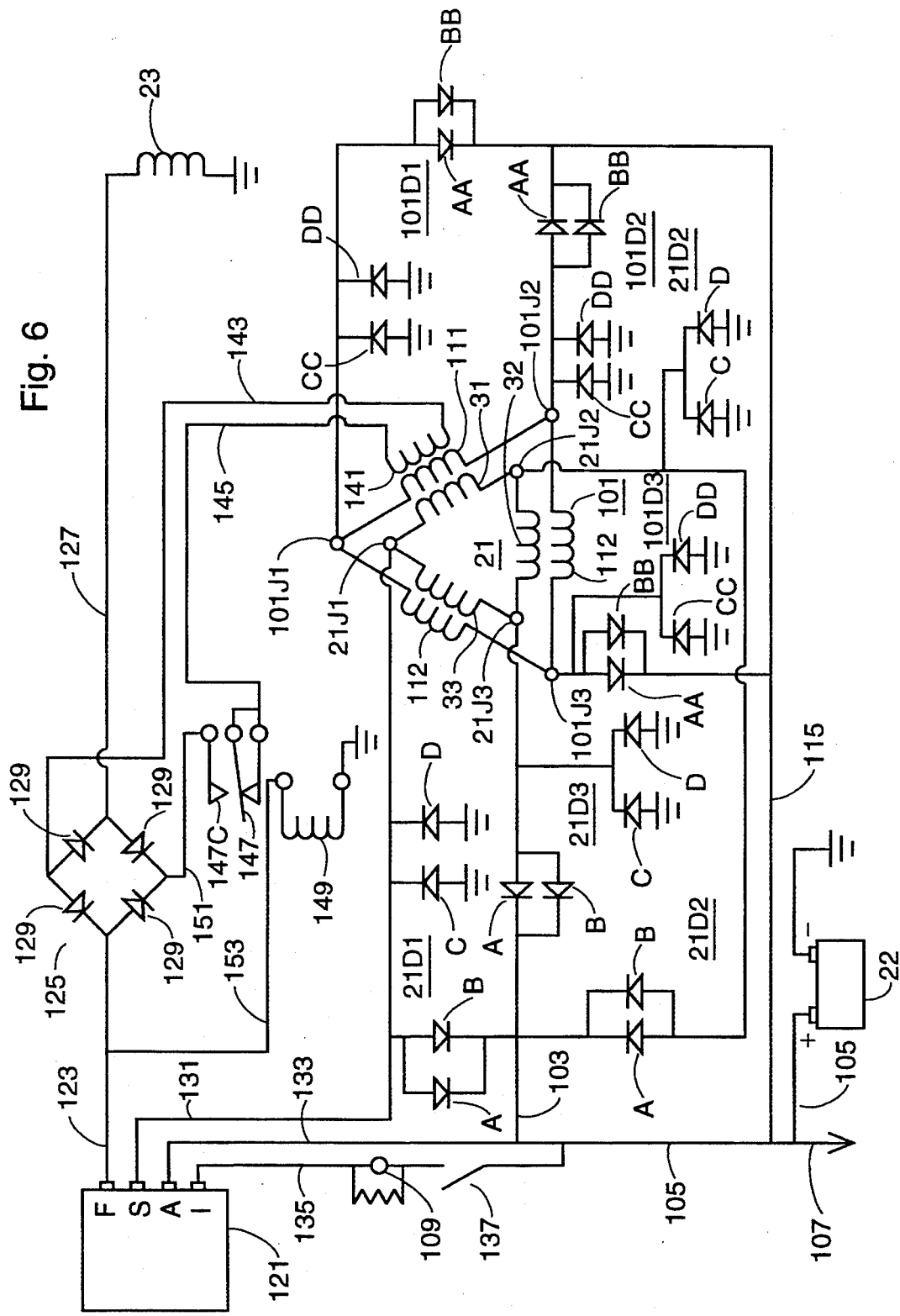
FIG. 6 is an electrical schematic of the embodiment of the invention wherein the two three phase windings are connected together in parallel.

Referring to FIG. 6 of the drawings the alternator comprises two three phase delta stator windings 21 and 101 connected together in parallel and to a 12 volt battery 22. The alternator has a single rotor coil 23. The winding 21 is the same as winding 21 of FIGS. 1–4 and is formed of three windings 31, 32, and 33 with the ends of adjacent windings connected together at junctions 21J1, 21J2, and 21J3 respectively. Three diode bridges 21D1, 21D2, and 21D3 are connected to junctions 21J1, 21J2, and 21J3 respectively and to a lead 103 which is connected by lead 105 to the plus terminal of the battery 22, the minus terminal of which is connected to ground. Each of the diode bridges comprises 4 diodes A, B, C, and D connected as shown. All of the diodes A and B are the same and all of the diodes C and D are the same. An output lead 107 is connected to lead 105.

The three phase winding 101 is formed of windings 111, 112, and 113 with the ends of adjacent windings connected together at junctions 101J1, 101J2, and 101J3 respectively. Three diode bridges 101D1, 101D2, and 101D3 are connected to junctions 101J1, 101J2, and 101J3 respectively and to a lead 115 which is connected to lead 105 which is connected to lead 105 and hence to output lead 107. Each of the diode bridges comprises 4 diodes AA, BB, CC, and DD connected as shown. All of the diodes AA and BB are the same and all of the diodes CC and DD are the same.

All of the windings 31, 32, and 33 are the same and all of the windings 111, 112, and 113 are the same.

A 12 volt regulator 121 is provided having terminals F, S, A, and I. The F terminal is connected to one end of the rotor coil 23 by way of lead 123, a full wave rectifier bridge 125, and lead 127. The bridge 125 comprises four diodes 129 connected as shown.

The S terminal of regulator 121 is connected by lead 131 to winding 21. The A terminal is connected by lead 133 to leads 103 and 105. The I terminal is connected to the ignition switch 137 of the vehicle by way of lead 135 which is also coupled to lead 105. Lead 135 includes a lamp 109.

A feedback winding 141 is electrically coupled across the bridge 125 by way of lead 143 and lead 145, normally open switch 147 of a relay coil 149 and lead 151. Coil 149 has one end connected by lead 153 to lead 123 and the other end connected to ground. Normally switch 147 does not engage contact 147C.

In operation of the system, the ignition switch 137 is closed and current is applied to the I terminal of the regulator 121 which current then goes to the F terminal. When the rotor 23 begins to rotate, voltage will appear on the S terminal which voltage will switch the A terminal to the F terminal by way of a transistor circuit in the regulator and the I terminal is released. Conventionally current flow form the A terminal regulates the output at 105 and 107 to 12 volts. If the voltage of the battery 22 is increased i.e. to 14 volts or decreased below 12 volts, the voltage on the rotor 23 is reduced or increased respectively by the regulator to maintain 12 volts across the battery.

By use of the full wave rectifier bridge 125, the output on lead 105 can be increased by 30% which is important at low engine r p m in emergency vehicles such as ambulances for operating its high electrical load including emergency equipment while idling. In this respect, when the voltage on the rotor reaches 8 or 10 volts, the coil 149 of the relay will cause switch 147 to engage contact 147C closing the relay and electrically connecting the winding 141 across the bridge 125. When the magnetic field of the rotor reaches a certain level, for example at maximum load, the flux density or magnetic field of the rotor coil 23 couples with the winding 141 and current flows to the bridge 125 which in effect becomes a series circuit and adds current to lead 127 from terminal F which increases the voltage on the rotor 23 up to 20 volts and hence the flux density supplied to the stator by the rotor which in turn increases the current supplied to the battery 22 and lead by up to 30%. When the output on lead 105 becomes too great and the current on lead 123 is reduced by the regulator during regulation, the current coil 149 is decreased and the switch 147 disengages contact 147C to prevent the winding 141 from causing a "run away" of the alternator which may otherwise destroy the alternator.

Windings 31, 32, and 33 are identical. They are the same as windings 31, 32, and 33 of FIGS. 2–4 and are wound on the core 237 in the same manner as described with reference to FIGS. 3 and 4 and Table I. Windings 111, 112, and 113 are identical but have different turns than windings 31, 32, and 33. Windings 31, 32, 33, 111, 112, and 113 are wound on the same stator core 237.

Figure 7:
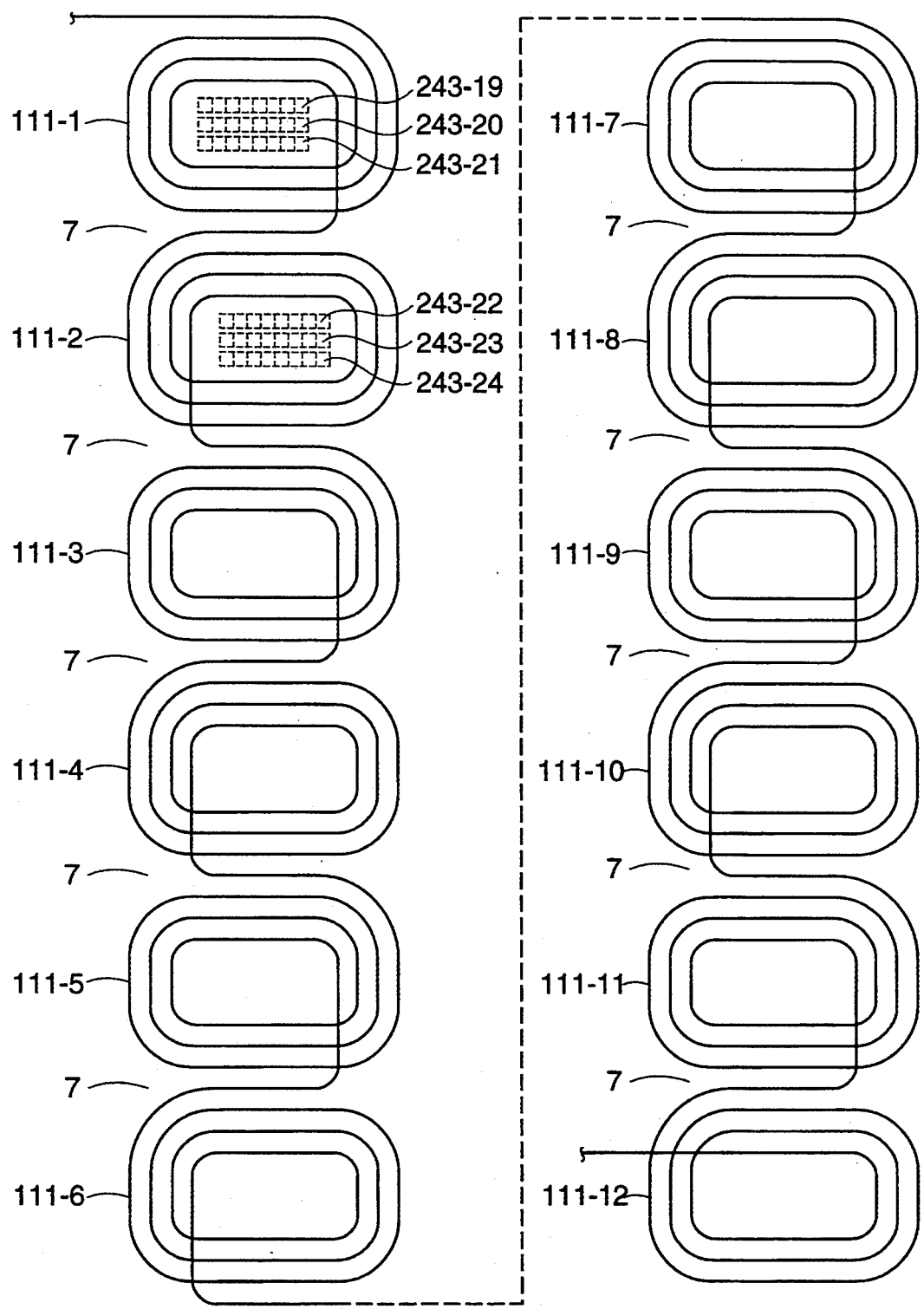
FIG. 7 illustrates one winding of one three phase winding of FIG. 6.

Winding 111 is shown in FIG. 7. It has 12 coils 111-1 through 111-12. The turns of the left hand edges of coils 111-1 to 111-12 are as follows: 3, 4, 3, 4, 3, 4, 3, 4, 3, 4, 3, 3, respectively with 7 turns between adjacent coils. The 12 coils, of winding 111 are wound around 12 groups three segments of the core 237, 180 degrees from the starting points of coils 31, 32, and 33 respectively. For example, referring to FIG. 8 and Table III, coil 111-1 is wound around a group of segments 243-19, 143-20, 243-21; coil 111-2 will be wound around a group of segments 234-22, 234-23, and 234-24 continuing counter clockwise such that the slots between adjacent groups of segments will have 7 turns of winding 51 located therebetween. Effectively the coil 111-12 is the same as the 4 turns coils 111-2, 111-4, 111-6, 111-8 and 111-10 since it provides sufficient turns on each of its two sides which when combined with the side turns of the adjacent coils 111-11 and 111-1, there are provided 7 turns between coil 111-12 and coil 111-11 and 7 turns between coil 111-12 and coil 111-1 in the slots of the core 237. The 12 coils of winding 112 will be wound around 12 groups of 3 segments starting with segments 243-18, 243-19, 243-20 and continuing counter clockwise as disclosed in Table III. The 12 coils of winding 113 will be wound around 12 groups of 3 segments starting with segments 243-17, 243-18, 243-19 and continuing counter clockwise as disclosed in Table III.

Figure 8:
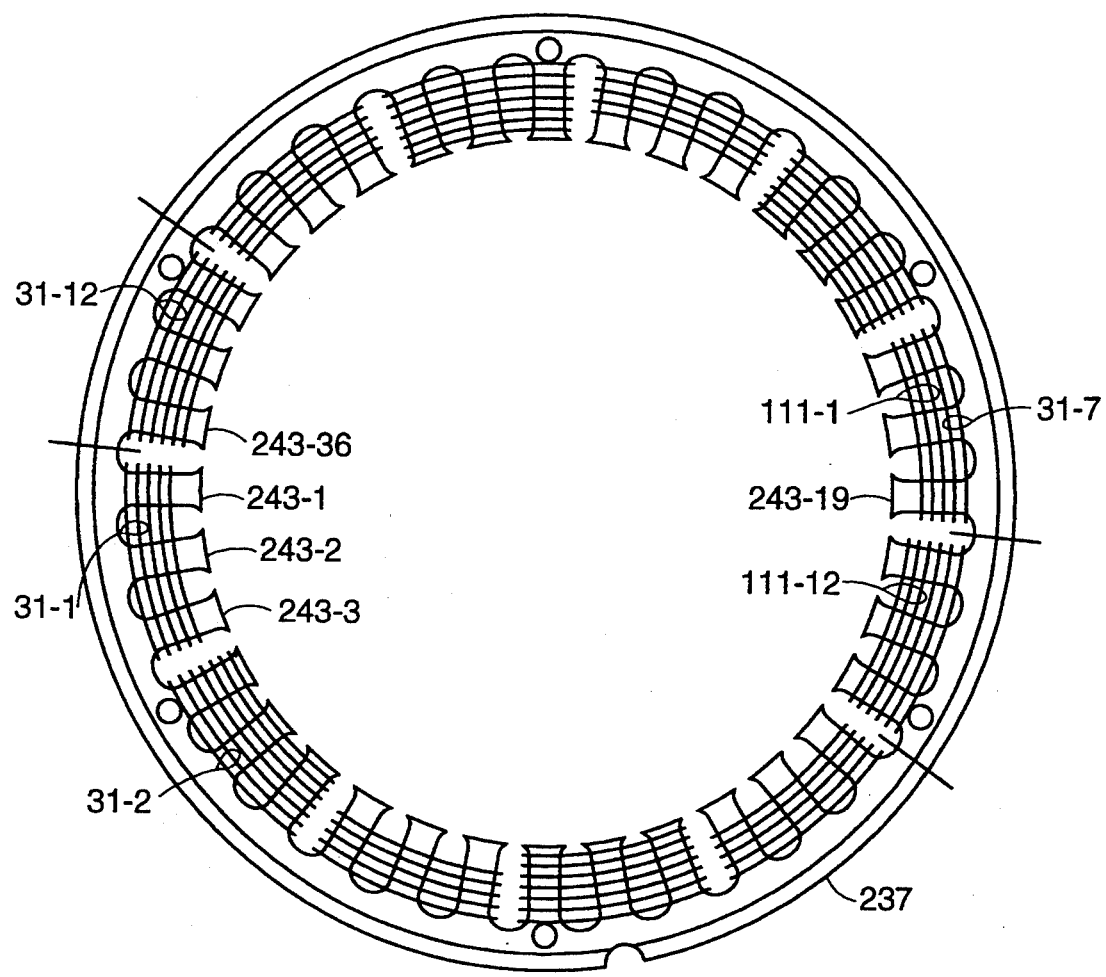
FIG. 8 is a plan view of the stator core of the alternator of FIG. 6 showing two windings of the two three phase windings wound on the stator core.
Figure 9:
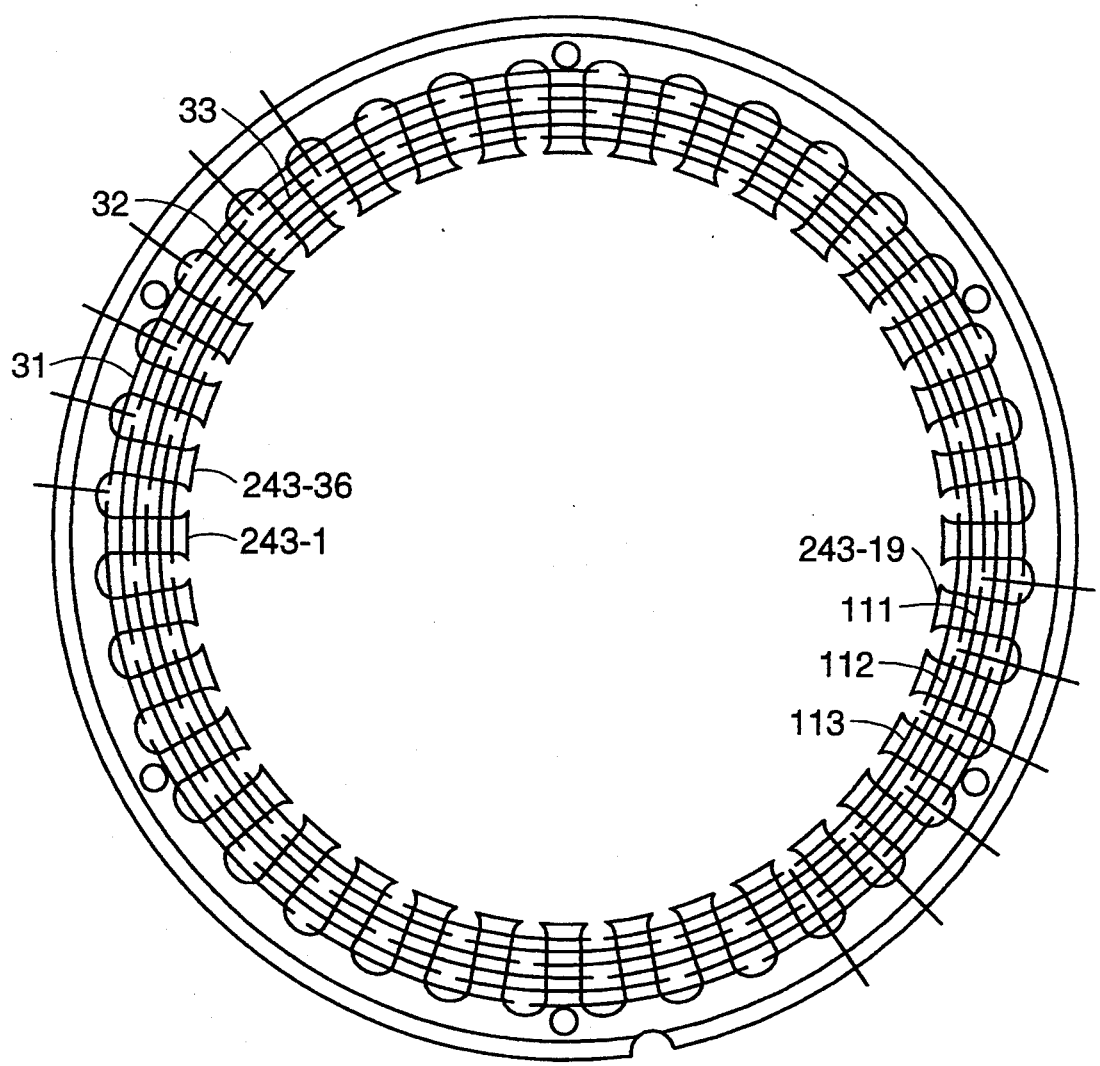
FIG. 9 is a plan view of the stator core of the alternator of FIG. 6 showing both three phase windings wound on the stator core.

In FIG. 9, the coils of windings 31, 32, and 33 are shown as single turn coils, although it is to be understood that each of the windings 31, 32, and 33 in FIG. 9 will be the same as winding 31 as shown in FIG. 2 and 3. In FIG. 9, the coils of windings 111, 112, and 113 are shown as single turn coils, although it is to be understood that each of the windings 111, 112, and 113 will be the same as winding 111 as shown in FIGS. 7 and 8.

Thus for windings 31 and 111 the coils with 2 and 3 turns respectively will be wound around the same groups of 3 segments respectively and the coils with 3 and 4 turns will be wound around the same groups of 3 segments respectively. Similarly, for windings 32 and 112, the coils with 2 and 3 turns respectively will be wound around the same groups of 3 segments respectively and the coils with 3 and 4 turns respectively will be wound around the same groups of 3 segments respectively. In addition, for coils 33 and 113, the coils with 2 and 3 turns respectively will be wound around the same groups of 3 segments respectively and the coils with 3 and 4 turns respectively will be wound around the same groups of 3 segments respectively. This results in a transformer action between the coils of 2 and 3 turns, wound around the same groups of segments, of the windings 31-111, 32-112, 33-113, and between the coils of 3 and 4 turns, wound around the same groups of segments, of windings 31-111, 32-112, 33-113 which increases the output of the alternator up to 30%.

Figure 11:
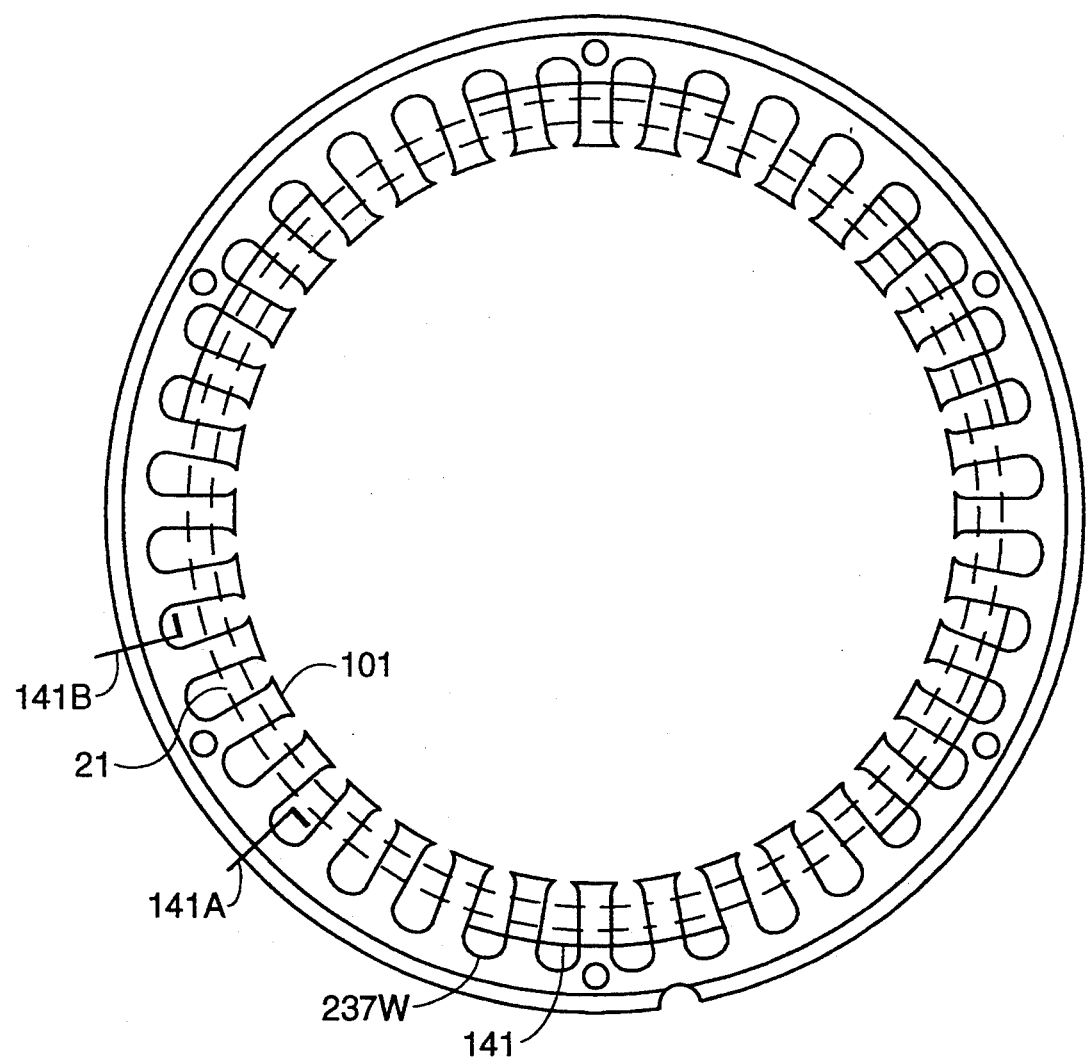
FIG. 11 illustrates the winding of FIG. 10 and the three phase windings of FIG. 6 wound on the stator core.
Figure 10:
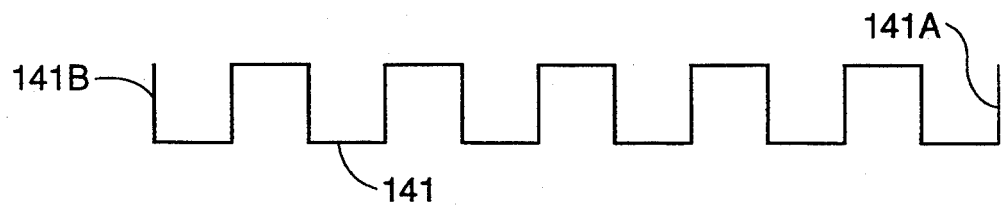
FIG. 10 is a single phase winding used in the feedback system of FIG. 6.

The feedbacking winding 141 is a single phase winding which has a plurality of $\frac{3}{4}$ turn coils as shown in FIG. 10. Each vertical portion of the winding 141 shown in FIG. 10 is located in a slot and each horizontal portion spans 3 segments. The coils of the winding 141 are located in the slots radially outward of the coils of the windings 31, 32, 33 and 111, 112, 113 and next to the walls 237W of the core 237 forming the outer extremities of the slots. This allows the coil 141 to effectively become magnetically coupled with the rotor coil 23 after the windings 111, 112, 113 and 31, 32, 33 become saturated from the field of the rotor coil. In FIG. 11, the two, three phase windings 21 and 101 are shown in dotted form.

The alternator structure of FIG. 5 will support the stator and rotor of the alternator of FIGS. 6–11.

It is to be understood that the core 237 may have a different number of segments than disclosed with the windings 21, 51, and 101 having an appropriate number of coils to fit in the slots of the core. In addition, the coils of the windings 21, 51, 101 may have turns different from that disclosed such that the principles of the invention are maintained.

TABLE I

| COIL | SEGMENTS 243- | COIL | SEGMENTS 243- | COIL | SEGMENTS 243- |
|---|---|---|---|---|---|
| 31-1 | 1, 2, 3 | 32-1 | 36, 1, 2 | 33-1 | 35, 36, 1 |
| 31-2 | 4, 5, 6 | 32-2 | 3, 4, 5 | 33-2 | 2, 3, 4 |
| 31-3 | 7, 8, 9 | 32-3 | 6, 7, 8 | 33-3 | 5, 6, 7 |
| 31-4 | 10, 11, 12 | 32-4 | 9, 10, 11 | 33-4 | 8, 9, 10 |
| 31-5 | 13, 14, 15 | 32-5 | 12, 13, 14 | 33-5 | 11, 12, 13 |
| 31-6 | 16, 17, 18 | 32-6 | 15, 16, 17 | 33-6 | 14, 15, 16 |
| 31-7 | 19, 20, 21 | 32-7 | 18, 19, 20 | 33-7 | 17, 18, 19 |
| 31-8 | 22, 23, 24 | 32-8 | 21, 22, 23 | 33-8 | 20, 21, 22 |
| 31-9 | 25, 26, 27 | 32-9 | 24, 25, 26 | 33-9 | 23, 24, 25 |
| 31-10 | 28, 29, 30 | 32-10 | 27, 28, 29 | 33-10 | 26, 27, 28 |
| 31-11 | 31, 32, 33 | 32-11 | 30, 31, 32 | 33-11 | 29, 30, 31 |
| 31-12 | 34, 35, 36 | 32-12 | 33, 34, 35 | 33-12 | 32, 33, 34 |

TABLE II

| COIL | SEGMENTS 243- | COIL | SEGMENTS 243- | COIL | SEGMENTS 243- |
|---|---|---|---|---|---|
| 61-1 | 19, 20, 21 | 62-1 | 18, 19, 20 | 63-1 | 17, 18, 19 |
| 61-2 | 22, 23, 24 | 62-2 | 21, 22, 23 | 63-2 | 20, 21, 22 |
| 61-3 | 25, 26, 27 | 62-3 | 24, 25, 26 | 63-3 | 23, 24, 25 |
| 61-4 | 28, 29, 30 | 62-4 | 27, 28, 29 | 63-4 | 26, 27, 28 |
| 61-5 | 31, 32, 33 | 62-5 | 30, 31, 32 | 63-5 | 29, 30, 31 |
| 61-6 | 34, 35, 36 | 62-6 | 33, 34, 35 | 63-6 | 32, 33, 34 |
| 61-7 | 1, 2, 3 | 62-7 | 36, 1, 2 | 63-7 | 35, 36, 1 |
| 61-8 | 4, 5, 6 | 62-8 | 3, 4, 5 | 63-8 | 2, 3, 4 |
| 61-9 | 7, 8, 9 | 62-9 | 6, 7, 8 | 63-9 | 5, 6, 7 |
| 61-10 | 10, 11, 12 | 62-10 | 9, 10, 11 | 63-10 | 8, 9, 10 |
| 61-11 | 13, 14, 15 | 62-11 | 12, 13, 14 | 63-11 | 11, 12, 13 |
| 61-12 | 16, 17, 18 | 62-12 | 15, 16, 17 | 63-12 | 14, 15, 16 |

TABLE III

| COIL | SEGMENTS | COIL | SEGMENTS | COIL | SEGMENTS |
|---|---|---|---|---|---|
| 111-1 | 19, 20, 21 | 112-1 | 18, 19, 20 | 113-1 | 17, 18, 19 |
| 111-2 | 22, 23, 24 | 112-2 | 21, 22, 23 | 113-2 | 20, 21, 22 |
| 111-3 | 25, 26, 27 | 112-3 | 24, 25, 26 | 113-3 | 23, 24, 25 |
| 111-4 | 28, 29, 30 | 112-4 | 27, 28, 29 | 113-4 | 26, 27, 28 |
| 111-5 | 31, 32, 33 | 112-5 | 30, 31, 32 | 113-5 | 29, 30, 31 |
| 111-6 | 34, 35, 36 | 112-6 | 33, 34, 35 | 113-6 | 32, 33, 34 |
| 111-7 | 1, 2, 3 | 112-7 | 36, 1, 2 | 113-7 | 35, 36, 1 |
| 111-8 | 4, 5, 6 | 112-8 | 3, 4, 5 | 113-8 | 2, 3, 4 |
| 111-9 | 7, 8, 9 | 112-9 | 6, 7, 8 | 113-9 | 5, 6, 7 |
| 111-1 | 10, 11, 12 | 112-1 | 9, 10, 11 | 113-1 | 8, 9, 10 |
| 111-1 | 13, 14, 15 | 112-11 | 12, 13, 14 | 113-11 | 11, 12, 13 |
| 111-12 | 16, 17, 18 | 112-12 | 15, 16, 17 | 113-12 | 14, 15, 16 |

I claim:

1. An alternator of the type having an annular stationary stator with a rotor coil concentrically located therein, comprising:

an annular structure formed of ferro-magnetic material defining an annular stator core having a plurality of segments equal to a whole number defined as n with adjacent segments being separated by a slot such that there are n slots which extend in a direction parallel to the axis of the stator core, a first three phase winding comprising three windings A, B, and C connected in a delta configuration, each of said A, B, and C windings having n/3 coils extending around said stator core, each of said coils of said A, B, and C windings comprising a plurality of turns of wire encircling a given number of said segments equal to a whole number defined as x wherein x is less than n/3 such that said coils of each of said A, B, and C windings encircle n/3 groups of x segments respectively with said n/3 coils of each of said A, B, and C winding having a plurality of turns located in n/3 of said slots respectively, a second three phase winding comprising three windings D, E, and F connected in a delta configuration, each of said windings D, E, and F having n/3 coils extending around said stator core, each of said coils of said D, E, and F windings comprising a plurality of turns of wire encircling a given number of said segments equal to x such that said coils of each of said D, E, and F windings encircle n/3 groups of x segments respectively with said n/3 coils of each of said D, E, and F windings having a plurality of turns located in n/3 of said slots respectively.

2. The alternator of claim 1, wherein:
said first and second three phase windings are connected together in series.

3. The alternator of claim 1, wherein:
said first and second three phase windings are connected together in parallel.

4. The alternator of claim 1, wherein:
said n/3 coils of said A and D windings encircle the stone groups of segments respectively,
said n/3 coils of said B and E windings encircle the stone groups of segments respectively,
said n/3 coils of said C and F windings encircle the same groups of segments respectively.

5. The alternator of claim 4, wherein:
said first and second three phase windings are connected together in series.

6. The alternator of claim 4, wherein:
said first and second three phase windings are connected together in parallel.

7. The alternator of claim 5, wherein:
each of said windings A, B, C, D, E, F, are substantially identical,
adjacent coils of each of said windings A, B, and C effectively have a different number of turns at least on one side thereof equal to y and z respectively,
adjacent coils of each of said windings D, E, and F effectively have a different number of turns at least on one side thereof equal to y and z respectively
wherein y is equal to a given number of turns and z is equal to a given number of turns different from that of y,
said coils of said A and D windings having y turns encircle the same groups of segments respectively,
said coils of said A and D windings having z turns encircle the same groups of segments respectively,
said coils of said B and E windings having y turns encircle the same groups of segments respectively, said coils of said B and E windings having z turns encircle the same groups of segments respectively, said coils of said C and F windings having y turns encircle the same groups of segments respectively, said coils of said C and F windings having z turns encircle the same groups of segments respectively.

8. The alternator of claim 6, wherein:

each of said windings A, B, and C are substantially identical, each of said windings D, E, and F are substantially identical, adjacent coils of each of said windings A, B, and C effectively have a different number of turns at least on one side thereof equal to y and z respectively;

wherein y is equal to a given number of turns and z is equal to a given number of turns different from that of y, adjacent coils of each of said windings D, E, and F effectively have a different number of turns at least on one side thereof equal to yy and zz respectively, wherein yy is equal to a given number of turns and zz is equal to a given number of turns different from that of yy;

wherein yy is different from that of y and zz is different from that of z, said coils of said A winding having y turns encircle a first group of segments respectively, said coils of said D winding having yy turns encircle said first group of segments respectively, said coils of said A winding having z turns encircle a second group of segments respectively, said coils of said D winding having zz turns encircle said second group of segments respectively, said coils of said B winding having y turns encircle a third group of segments respectively, said coils of said E winding having yy turns encircle said third group of segments respectively, said coils of said B winding having z turns encircle a fourth group of segments respectively, said coils of said E winding having zz turns encircle said fourth group of segments respectively, said coils of said C winding having y turns encircle a fifth group of segments respectively, said coils of said F winding having yy turns encircle said fifth group of segments respectively, said coils of said C winding having z turns encircle a sixth group of segments respectively, said coils of said F winding having zz turns encircle said sixth group of segments respectively.

9. The alternator of claim 7, comprising:

a first battery having plus and minus terminals, a second battery having plus and minus terminals, said A and B windings are coupled together and to a first rectifier, said B and C windings are coupled together and to a second rectifier, said C and A windings are coupled together and to a third rectifier, said first, second and third rectifiers are coupled together to a first output and to said plus terminal of said first battery, said minus terminal of said first battery being coupled to ground, said D and E windings are coupled together and to a fourth rectifier, said E and F windings are coupled together and to a fifth rectifier, said F and D windings are coupled together and to a sixth rectifier, said fourth, fifth, and sixth rectifiers are coupled together to a second output and to said plus terminal of said second battery, and means for coupling said minus terminal of said first battery said plus terminal of said second battery.

10. The alternator of claim 8, comprising:

a battery having plus and minus terminals, said A and B windings are coupled together and to a first rectifier, said B and C windings are coupled together and to a second rectifier, said C and A windings are coupled together and to a third rectifier, said D and E windings are coupled together and to a fourth rectifier, said E and F windings are coupled together and to a fifth rectifier, said F and D windings are coupled together and to a sixth rectifier, said first, second, and third rectifiers are coupled together to an output and to said plus terminal of said battery, said fourth, fifth, and sixth rectifiers are coupled together to said output and to said plus terminal of said battery, said minus terminal of said battery being coupled to ground.

11. The alternator of claim 10, comprising:

a rectifier bridge, a regulator having an input coupled to said plus terminal of said battery and a regulator output coupled to said rotor coil by way of said rectifier bridge, a relay coil having one end coupled to said regulator output between said regulator and said rectifier bridge and one end coupled to ground, a normally open electrical switch coupled to said rectifier bridge and which is closed by said relay coil when said relay coil is energized and which opens when said relay coil is de-energized, and a single phase winding comprising a plurality of coils wound on said stator core having one end coupled to said switch and a second end coupled to said rectifier bridge for producing current for application to said rectifier bridge for increasing current applied to said rotor coil and hence the current output of said first and second three phase windings when said relay coil is energized and said switch is closed.

12. The alternator of claim 9, comprising:

a single regulator coupled to said alternator for regulation purposes.

13. The alternator of claim 10, comprising:

a single regulator coupled to said alternator for regulation purposes.

14. The alternator of claim 1, wherein:

x times n/3 is equal to n.

15. The alternator of claim 1, wherein:

said windings A, B, C, D, E, and F extend around said stator core from different beginning positions respectively, said beginning positions of said D, E, and F windings are located 180° relative to the beginning positions of windings A, B, and C respectively.

16. The alternator of claim 15, wherein:

x times n/3 is equal to n.

17. The alternator of claim 7, wherein:
said windings A, B, C, D, E, and F extend around said stator core from different beginning positions respectively,
said beginning positions of said D, E, and F windings are located 180° relative to the beginning positions of windings A, B, and C respectively.

18. The alternator of claim 8, wherein:
said windings A, B, C, D, E, and F extend around said stator core from different beginning positions respectively,
said beginning positions of said D, E, and F windings are located 180° relative to the beginning positions of windings A, B, and C respectively.

19. An alternator of the type having an annular stationary stator with a rotor coil concentrically located therein, comprising:
an annular structure formed of ferro-magnetic material defining a single annular stator core having thirty six segments with adjacent segments being separated by a slot such that there are thirty six slots which extend in a direction parallel to the axis of the stator core,
a first three phase winding comprising three windings A, B, and C connected in a delta configuration,
each of said A, B, and C windings having twelve coils extending around said stator core,
each of said coils of said A, B, and C windings comprising a plurality of turns of wire encircling three of said segments such that said coils of each of said A, B, and C windings encircle twelve groups of three segments respectively with said twelve coils of each of said A, B, and C winding having a plurality of turns located in twelve of said slots respectively,
a second three phase winding comprising three windings D, E, and F connected in a delta configuration,
each of said windings D, E, and F having twelve coils extending around said stator core,
each of said coils of said D, E, and F windings comprising a plurality of turns of wire encircling three of said segments such that said coils of each of said D, E, and F windings encircle twelve groups of three segments respectively with said twelve coils of each of said D, E, and F windings having a plurality of turns located in twelve of said slots respectively.

20. The alternator of claim 19, wherein:
said first and second three phase windings are connected together in series.

21. The alternator of claim 19, wherein:
said first and second three phase windings are connected together in parallel.

22. The alternator of claim 19, wherein:
said twelve coils of said A and D windings encircle the same groups of segments respectively,
said twelve coils of said B and E windings encircle the same groups of segments respectively,
said twelve coils of said C and F windings encircle the same groups of segments respectively.

23. The alternator of claim 22, wherein:
said first and second three phase windings are connected together in series.

24. The alternator of claim 22, wherein:
said first and second three phase windings are connected together in parallel.

25. The alternator of claim 23 wherein:
each of said windings A, B, C, D, E, F, are substantially identical,
adjacent coils of each of said windings A, B, and C effectively have a different number of turns at least on one side thereof equal to y and z respectively,
adjacent coils of each of said windings D, E, and F effectively have a different number of turns at least on one side thereof equal to y and z respectively
wherein y is equal to a given number of turns and z is equal to a given number of turns different from that of y,
said coils of said A and D windings having y turns encircle the same groups of segments respectively,
said coils of said A and D windings having z turns encircle the same groups of segments respectively,
said coils of said B and E windings having y turns encircle the same groups of segments respectively,
said coils of said B and E windings having z turns encircle the same groups of segments respectively,
said coils of said C and F windings having y turns encircle the same groups of segments respectively,
said coils of said C and F windings having z turns encircle the same groups of segments respectively.

26. The alternator of claim 24, wherein:
each of said windings A, B, and C are substantially identical,
each of said windings D, E, and F are substantially identical,
adjacent coils of each of said windings A, B, and C effectively have a different number of turns at least on one side thereof equal to y and z respectively;
wherein y is equal to a given number of turns and z is equal to a given number of turns different from that of y,
adjacent coils of each of said windings D, E, and F effectively have a different number of turns at least on one side thereof equal to yy and zz respectively,
wherein yy is equal to a given number of turns and zz is equal to a given number of turns different from that of yy;
wherein yy is different from that of y and zz is different from that of z,
said coils of said A winding having y turns encircle a first group of segments respectively,
said coils of said D winding having yy turns encircle said first group of segments respectively,
said coils of said A winding having z turns encircle a second group of segments respectively,
said coils of said D winding having zz turns encircle said second group of segments respectively,
said coils of said B winding having y turns encircle a third group of segments respectively,
said coils of said E winding having yy turns encircle said third group of segments respectively,
said coils of said B winding having z turns encircle a fourth group of segments respectively,
said coils of said E winding having zz turns encircle said fourth group of segments respectively,
said coils of said C winding having y turns encircle a fifth group of segments respectively,
said coils of said F winding having yy turns encircle said fifth group of segments respectively,
said coils of said C winding having z turns encircle a sixth group of segments respectively,
said coils of said F winding having zz turns encircle said sixth group of segments respectively.

27. The alternator of claim 19, wherein:

said windings A, B, C, D, E, and F extend around said stator core from different beginning positions respectively, said beginning positions of said D, E, and F windings are located 180° relative to the beginning positions of windings A, B, and C respectively.

28. The alternator of claim 25, wherein:

said windings A, B, C, D, E, and F extend around said stator core from different beginning positions respectively, said beginning positions of said D, E, and F windings are located 180° relative to the beginning positions of windings A, B, and C respectively.

29. The alternator of claim 26, wherein:

said windings A, B, C, D, E, and F extend around said stator core from different beginning positions respectively, said beginning positions of said D, E, and F windings are located 180° relative to the beginning positions of windings A, B, and C respectively.

30. The alternator of claim 1, wherein:

each of said windings A, B, C, D, E, F, are substantially identical, adjacent coils of each of said windings A, B, and C effectively have a different number of turns at least on one side thereof equal to y and z respectively, adjacent coils of each of said windings D, E, and F effectively have a different number of turns at least on one side thereof equal to y and z respectively wherein y is equal to a given number of turns and z is equal to a given number of turns different from that of y, said coils of said A and D windings having y turns encircle the same groups of segments respectively, said coils of said A and D windings having z turns encircle the same groups of segments respectively, said coils of said B and E windings having y turns encircle the same groups of segments respectively, said coils of said B and E windings having z turns encircle the same groups of segments respectively, said coils of said C and F windings having y turns encircle the same groups of segments respectively, said coils of said C and F windings having z turns encircle the same groups of segments respectively.

31. The alternator of claim 30, wherein y is equal to 3 and z is equal to 2.

32. The alternator of claim 1, wherein:

each of said windings A, B, and C are substantially identical, each of said windings D, E, and F are substantially identical, adjacent coils of each of said windings A, B, and C effectively have a different number of turns at least on one side thereof equal to y and z respectively;

wherein y is equal to a given number of turns and z is equal to a given number of turns different from that of y, adjacent coils of each of said windings D, E, and F effectively have a different number of turns at least on one side thereof equal to yy and zz respectively, wherein yy is equal to a given number of turns and zz is equal to a given number of turns different from that of yy;

wherein yy is different from that of y and zz is different from that of z, said coils of said A winding having y turns encircle a first group of segments respectively, said coils of said D winding having yy turns encircle said first group of segments respectively, said coils of said A winding having z turns encircle a second group of segments respectively, said coils of said D winding having zz turns encircle said second group of segments respectively, said coils of said B winding having y turns encircle a third group of segments respectively, said coils of said E winding having yy turns encircle said third group of segments respectively, said coils of said B winding having z turns encircle a fourth group of segments respectively, said coils of said E winding having zz turns encircle said fourth group of segments respectively, said coils of said C winding having y turns encircle a fifth group of segments respectively, said coils of said F winding having yy turns encircle said fifth group of segments respectively, said coils of said C winding having z turns encircle a sixth group of segments respectively, said coils of said F winding having zz turns encircle said sixth group of segments respectively.

33. The alternator of claim 19, wherein:

each of said windings A, B, C, D, E, F, are substantially identical, adjacent coils of each of said windings A, B, and C effectively have a different number of turns at least on one side thereof equal to y and z respectively, adjacent coils of each of said windings D, E, and F effectively have a different number of turns at least on one side thereof equal to y and z respectively, wherein y is equal to a given number of turns and z is equal to a given number of turns different from that of y, said coils of said A and D windings having y turns encircle the same groups of segments respectively, said coils of said A and D windings having z turns encircle the same groups of segments respectively, said coils of said B and E windings having y turns encircle the same groups of segments respectively, said coils of said B and E windings having z turns encircle the same groups of segments respectively, said coils of said C and F windings having y turns encircle the same groups of segments respectively, said coils of said C and F windings having z turns encircle the same groups of segments respectively.

34. The alternator of claim 33, wherein y is equal to 3 and z is equal to 2.

35. The alternator of claim 34, wherein:

said windings A, B, C, D, E, and F extend around said stator core from different beginning positions respectively, said beginning positions of said D, E, and F windings are located 180° relative to the beginning positions of windings A, B, and C respectively.

36. The alternator of claim 19, wherein:

each of said windings A, B, and C are substantially identical, each of said windings D, E, and F are substantially identical, adjacent coils of each of said windings A, B, and C effectively have a different number of turns at least on one side thereof equal to y and z respectively;

wherein y is equal to a given number of turns and z is equal to a given number of turns different from that of y, adjacent coils of each of said windings D, E, and F effectively have a different number of turns at least on one side thereof equal to yy and zz respectively, wherein yy is equal to a given number of turns and zz is equal to a given number of turns different from that of yy;

wherein yy is different from that of y and zz is different from that of z, said coils of said A winding having y turns encircle a first group of segments respectively, said coils of said D winding having yy turns encircle said first group of segments respectively, said coils of said A winding having z turns encircle a second group of segments respectively, said coils of said D winding having zz turns encircle said second group of segments respectively, said coils of said B winding having y turns encircle a third group of segments respectively, said coils of said E winding having yy turns encircle said third group of segments respectively, said coils of said B winding having z turns encircle a fourth group of segments respectively, said coils of said E winding having zz turns encircle said fourth group of segments respectively, said coils of said C winding having y turns encircle a fifth group of segments respectively, said coils of said F winding having yy turns encircle said fifth group of segments respectively, said coils of said C winding having z turns encircle a sixth group of segments respectively, said coils of said F winding having zz turns encircle said sixth group of segments respectively.

37. The alternator of claim 36, wherein:

said windings A, B, C, D, E, and F extend around said stator core from different beginning positions respectively, said beginning positions of said D, E, and F windings are located 180° relative to the beginning positions of windings A, B, and C respectively.

38. An alternator of the type having an annular stationary stator with a rotor coil concentrically located therein, comprising:

an annular structure formed of ferro-magnetic material defining a single annular stator core having a plurality segments equal to a whole number defined as n with adjacent segments being separated by a slot such that there are n slots which extend in a direction parallel to the axis of the stator core, a first three phase winding comprising three windings A, B, and C connected together, each of said A, B, and C windings having n/3 coils extending around said stator core, each of said coils of said A, B, and C windings comprising a plurality of turns of wire encircling a given number of said segments, a second three phase winding comprising three windings D, E, and F connected together, each of said windings D, E, and F having n/3 coils extending around said stator core, each of said coils of said D, E, and F windings comprising a plurality of turns of wire encircling a given number of said segments, said windings A, B, C, D, E, and F extend around said stator core from different beginning positions respectively, said beginning positions of said D, E, and F windings are located 180° relative to the beginning positions of windings A, B, and C respectively.

39. An alternator of the type having an annular stationary stator with a rotor coil concentrically located therein, comprising:

an annular structure formed of ferro-magnetic material defining a single annular stator core having a plurality of segments equal to a whole number defined as n with adjacent segments being separated by a slot such that there are n slots which extend in a direction parallel to the axis of the stator core, a first three phase winding comprising three windings A, B, and C connected together, each of said A, B, and C windings having n/3 coils extending around said stator core, each of said coils of said A, B, and C windings comprising a plurality of turns of wire encircling a given number of said segments equal to a whole number defined as x wherein x is less than n/3 such that said coils of each of said A, B, and C windings encircle n/3 groups of x segments respectively with said n/3 coils of each of said A, B, and C winding having a plurality of turns located in n/3 of said slots respectively, a second three phase winding comprising three windings D, E, and F connected together, each of said windings D, E, and F having n/3 coils extending around said stator core, each of said coils of said D, E, and F windings comprising a plurality of turns of wire encircling a given number of said segments equal to x such that said coils of each of said D, E, and F windings encircle n/3 groups of x segments respectively with said n/3 coils of each of said D, E, and F windings having a plurality of turns located in n/3 of said slots respectively, said windings A, B, C, D, E, and F extend around said stator core from different beginning positions respectively, said beginning positions of said D, E, and F windings are located 180° relative to the beginning positions of windings A, B, and C respectively.

* * * * *